(12) United States Patent
Meyer et al.

(10) Patent No.: US 11,549,534 B2
(45) Date of Patent: Jan. 10, 2023

(54) ROTARY FASTENER FOR SECURING A FENESTRATION PANEL

(71) Applicant: JELD-WEN, Inc., Klamath Falls, OR (US)

(72) Inventors: Shane Meyer, Klamath Falls, OR (US); Chris Graetsch, Klamath Falls, OR (US); David Yagla, Klamath Falls, OR (US); Philip Perkins, Klamath Falls, OR (US)

(73) Assignee: JELD-WEN, Inc., Charlotte, NC (US)

( * ) Notice: Subject to any disclaimer, the term of this patent is extended or adjusted under 35 U.S.C. 154(b) by 899 days.

(21) Appl. No.: 16/226,431

(22) Filed: Dec. 19, 2018

(65) Prior Publication Data
US 2020/0200202 A1 Jun. 25, 2020

(51) Int. Cl.
| E06B 3/54 | (2006.01) |
| F16B 12/20 | (2006.01) |
| F16B 5/06 | (2006.01) |
| F16B 5/07 | (2006.01) |

(52) U.S. Cl.
CPC .......... F16B 5/0685 (2013.01); E06B 3/5481 (2013.01); F16B 5/07 (2013.01); F16B 12/2027 (2013.01); Y10T 403/7009 (2015.01)

(58) Field of Classification Search
CPC .... F16B 5/0012; F16B 5/0084; F16B 5/0092; F16B 5/0685; F16B 5/07; F16B 12/20; F16B 12/2009; F16B 12/2027; F16B 12/2036; F16B 2012/2072; F16B 12/10; Y10T 403/59; Y10T 403/591;
(Continued)

(56) References Cited

U.S. PATENT DOCUMENTS 1,224,228 A * 5/1917 Solaini .................... E05B 59/00
70/107
2,647,287 A * 8/1953 Jones .................... E04B 1/6183
52/582.2
(Continued)

FOREIGN PATENT DOCUMENTS

DE 1827151 U 2/1961
DE 2025841 A1 12/1971
(Continued)

OTHER PUBLICATIONS

International Search Report and Written Opinion for Application PCT/US2019/066967, dated Apr. 21, 2020, 13 pages.

*Primary Examiner* — Michael P Ferguson
(74) *Attorney, Agent, or Firm* — Lorenz & Kopf, LLP

(57) ABSTRACT

A fastener system for securing a panel to a frame comprises one or more rotating fasteners installed in the perimeter edge of the panel. In operation, one or more cam surfaces of the fastener engage receiving surfaces of a receiver on the frame such that, upon rotation of each fastener, the panel is drawn toward the frame. In some embodiments, the panel is moved in a first direction parallel to the panel and a second direction perpendicular to the panel or in a composite diagonal direction inclined relative to the panel. The fastener system may facilitate compression of seals disposed along the perimeter edge of the panel and between a side of the panel and rabbet ledge of the frame and may further facilitate removal and maintenance of the panel.

20 Claims, 10 Drawing Sheets

(58) Field of Classification Search
CPC ............... Y10T 403/60; Y10T 403/608; Y10T 403/7009; E06B 3/54; E06B 3/5427; E06B 3/5481
USPC .................................. 403/DIG. 12, DIG. 13
See application file for complete search history.

(56) References Cited

U.S. PATENT DOCUMENTS

| | | | | |
|---|---|---|---|---|
| 2,714,751 A * | 8/1955 | Stuart | ..................... | F16B 12/20 52/582.2 |
| 3,191,244 A * | 6/1965 | William | ............. | E05B 65/0817 52/127.9 |
| 3,472,545 A * | 10/1969 | Berkowitz | ............ | E04B 1/6183 292/111 |
| 3,661,410 A * | 5/1972 | Larson | ................ | E05B 65/0817 52/127.9 |
| 4,103,854 A * | 8/1978 | Pliml | ..................... | F16B 5/0685 248/222.11 |
| 4,131,376 A | 12/1978 | Busse | | |
| 4,417,430 A * | 11/1983 | Loikitz | ................ | E04B 1/6183 292/111 |
| 4,472,914 A * | 9/1984 | DeBoef | .................... | E06B 3/28 52/202 |
| 4,507,010 A * | 3/1985 | Fujiya | ................ | E04B 1/6183 292/98 |
| 4,582,446 A * | 4/1986 | Salice | ................. | F16B 12/2027 403/322.4 |
| 4,611,841 A * | 9/1986 | Net | ......................... | E06B 5/006 292/241 |
| 4,641,988 A * | 2/1987 | Ganner | ............... | F16B 12/2027 52/285.4 |
| 4,991,349 A * | 2/1991 | Barthelemy | ............... | B60J 1/10 49/504 |
| 7,168,213 B2 * | 1/2007 | Rudduck | ................ | A47B 91/02 52/235 |
| 8,092,114 B2 * | 1/2012 | Baur | ................... | F16B 12/2009 403/254 |
| 8,240,942 B2 * | 8/2012 | Baur | ................... | F16B 12/2036 403/321 |
| 9,863,143 B2 * | 1/2018 | Finkelstein | ............. | E05C 19/12 |
| 10,012,018 B1 * | 7/2018 | Plummer | ............... | E06B 3/5892 |
| 10,113,575 B2 * | 10/2018 | Baur | ..................... | F16B 5/0084 |
| 2007/0292205 A1 | 12/2007 | Duval | | |
| 2011/0091269 A1 | 4/2011 | Solly et al. | | |

FOREIGN PATENT DOCUMENTS

| | | | | |
|---|---|---|---|---|
| DE | 20317163 U1 * | 1/2004 | ........... | E06B 3/5481 |
| DE | 20317163 U1 | 1/2004 | | |
| GB | 2040385 A | 8/1980 | | |

* cited by examiner

ROTARY FASTENER FOR SECURING A FENESTRATION PANEL

TECHNICAL FIELD

The field of this disclosure relates to fastener systems and more particularly to fastener systems and methods for mounting and securing a fenestration panel to a frame.

BACKGROUND

Fenestration panels may consist of window panels, door panels and non-moving "fixed" panels installed into frames. The panels and frames may be provided as a package, or the frames may be custom built. A panel may also provide an environmental barrier and hence may comprise seals between the panel and the frame. Some panels are movable, such as a sliding window or door. Other panels may be fixed to the frame so they cannot move relative to the frame. Fixed panels may need to be occasionally removed for repairs, maintenance, cleaning, etc. In many cases, the frame may include a rabbet into which the fixed panel is to be installed. Conventionally, a fixed panel may be attached to the frame through the use of screws and/or adhesives. Screws can detract from the aesthetic appearance of the panel, and adhesives preclude removal. Panels may also be large and heavy, sometimes weighing hundreds of pounds. In such cases, handling the panels during installation may be difficult and awkward. For example, once placed within a frame opening, adjusting the side-to-side position of the panel may be difficult. Before a fixed panel is secured to the frame, it may be necessary to compress one or more seals located along a perimeter edge of the panel or on a side of the panel or rabbet adjacent the perimeter, further adding to the difficulty of installation. The present inventor has recognized a need for an improved fastening system that facilitates removably securing a panel to a frame.

SUMMARY

A system for attaching a panel to a frame comprises a fastener rotatably coupled to either the panel or the frame. The fastener may include an inward facing radial cam surface having a decreasing radius in a first direction of rotation of the fastener disposed about an axis of rotation. The fastener may also include a helical cam surface disposed about the axis of rotation. The helical cam surface may be disposed substantially orthogonal to the radial cam surface. The system also comprises a receiver coupled to the other one of the panel or the frame, for cooperative engagement with the fastener. The receiver may comprise a cam follower coupled to the receiver and positioned to contact and follow the radial cam surface and a receiver surface positioned to contact and follow the helical cam surface. The system may be configured such that upon rotation of the fastener, a contact force between the radial cam surface and the follower moves the panel relative to the frame in a first direction, and a contact force between the helical cam surface and the receiver surface moves the panel relative to the frame in a second direction. In some embodiments, rotation of the fastener through a first angle of rotation moves the panel in the first direction and rotation of the fastener through a second angle of rotation moves the panel in the second direction. The first and second angles of rotation may be separate and distinct or they may partially or completely overlap. One of the first and second angles of rotation may precede the other.

The system may further comprise a chassis to which the fastener is rotatably coupled, wherein the chassis is mountable within a recess disposed along a perimeter edge of the panel, such that a opening face of the chassis is flush with or recessed beneath the perimeter edge. The fastener may include a perimeter having a curved surface and a flat surface. The flat surface may be located relative to other aspects of the fastener such that the flat surface is aligned with the opening face of the chassis when the fastener is disposed at an initial angular position in which the fastener is not engaged with the receiver or cam follower. The fastener or chassis may also comprise a stop that limits rotation of the fastener in one or both directions. The fastener may be rigidly coupled to an axle to facilitate co-rotation and also to inhibit longitudinal displacement of the fastener along and relative to the axle and/or the chassis, and the axle may he rotatably coupled to the chassis. The axle may comprise a tool interface such as a driver socket to accept the application of a torque applied by a tool. The fastener may comprise a detest inhibiting inadvertent rotation of the fastener from its initial angular position in the absence of a torque applied by the tool.

In one embodiment, a fenestration assembly comprises a fenestration panel having a front side, a rear side opposite the front side, a thickness between the front side and the rear side, and a fenestration frame having an opening sized to receive the fenestration panel. A plurality of rotatable cam fasteners are spaced apart along at least a portion of an outer perimeter of the panel between the front and rear sides. Each of the fasteners has an axis of rotation which is preferably disposed perpendicular to the panel, a radial cam surface having a decreasing radius in a first direction of rotation of the fastener disposed about the axis of rotation, and preferably a helical cam surface disposed about the axis of rotation. The fenestration assembly also comprises a plurality of cam receivers spaced apart along at least a portion of an inner perimeter of the frame, such that each receiver is positioned to be in alignment with one of the plurality of rotatable cam fasteners. Each receiver includes a cam follower coupled to the receiver and positioned to be contacted by and follow the radial cam surface along at least a portion of the angular rotation of the fastener. Each receiver may also include a receiver surface positioned to be slidably contacted by the helical cam surface. The fenestration assembly may be configured such that upon rotation of the fastener, a contact force between the radial cam surface and the cam follower moves the panel relative to the frame in a first direction, and a contact force between the helical cam surface and the receiver surface moves the panel relative to the frame in a second direction. The second direction may be substantially orthogonal to the first direction. The first direction may be substantially parallel to the panel and the second direction may be substantially perpendicular to the panel. Movement of the panel in the first direction may compress a seal disposed between at least a portion of the outer perimeter of the panel and at least a portion of the inner perimeter of the frame. The frame may comprise a rabbet defining an adjacent ledge, soffit, or stop disposed along at least a portion of the inner perimeter of the frame such that movement of the panel in the second direction compresses a seal disposed between the front side of the panel, or the rear side of the panel, and the soffit, stop, or ledge. In some embodiments, the fenestration assembly may also include one or more catchless receivers that do not include the cam follower, such that rotation of the corresponding fastener only drives the panel the second direction. Catchless receivers may be employed along a top (head) of the frame, for example, to allow the panel to remain seated along the bottom (sill) of the frame, rather than causing the panel to be suspended from the head of the frame.

In another embodiment, a method of installing a panel to a frame may comprise providing a panel with a plurality of rotatable cam fasteners disposed along at least a portion of an outer perimeter of the panel between front and rear sides of the panel, wherein each of the rotatable cam fasteners has an axis of rotation which is preferably perpendicular to the panel, a first cam surface disposed at least partially about the axis of rotation, and preferably a second cam surface disposed at least partially about the axis of rotation, and wherein the second cam surface is substantially orthogonal to the first cam surface. The method further comprises providing a frame sized to receive the panel and having a plurality of complementary receivers disposed along at least a portion of an inner perimeter surface of the frame such that each receiver is positioned to be in alignment with one of the plurality of rotatable cam fasteners when the panel is installed in the frame. The method further comprises placing the panel within the frame and rotating each rotatable cam fastener, wherein upon rotation, the first cam surface engages the first cam receiving surface, drawing the panel toward the frame in a first direction. If the second cam surface is present, it may engage the second cam receiving surface and cause the panel to move in a second direction orthogonal to the first direction. The method may further comprise inserting a tool through an orifice in the front side or the rear side of the panel, establishing a torque interface between the tool and the rotatable cam fastener, and rotating each fastener between 80 and 190 degrees.

Fasteners, fastener systems, and securement methods according to the present disclosure are particularly useful for attaching stationary fenestration panels to a frame. For example, the systems and methods may be used to secure a heavy fixed glazed panel of a sliding door assembly. Additional aspects and advantages will be apparent from the following detailed description of preferred embodiments, which proceeds with reference to the accompanying drawings.

BRIEF DESCRIPTION OF THE DRAWINGS

FIG. 4A-2 is a side sectional view of the fastener system FIG. 4A-1.

FIGS. 4B-1 and 4B-2 are respective front and side sectional views of the fastening system of FIG. 4A-1, showing the cam fastener in an position of initial engagement with the receiver.

FIGS. 4C-1 and 4C-2 are respective front and side sectional views of the fastening system of FIG. 4A-1, illustrating further engagement of the cam fastener with the receiver, relative to FIG. 4B-1.

FIGS. 4D-1 and 4D-2 are respective front and side sectional views of the fastening system of FIG. 4A-1, illustrating further engagement of the cam fastener with the receiver, relative to FIG. 4C-1.

FIGS. 4E-1 and 4E-2 are respective front and side sectional views of the fastening system of FIG. 4A-1, showing the cam fastener in a position of full engagement with the receiver.

DETAILED DESCRIPTION OF PREFERRED EMBODIMENTS

Figure 1A:
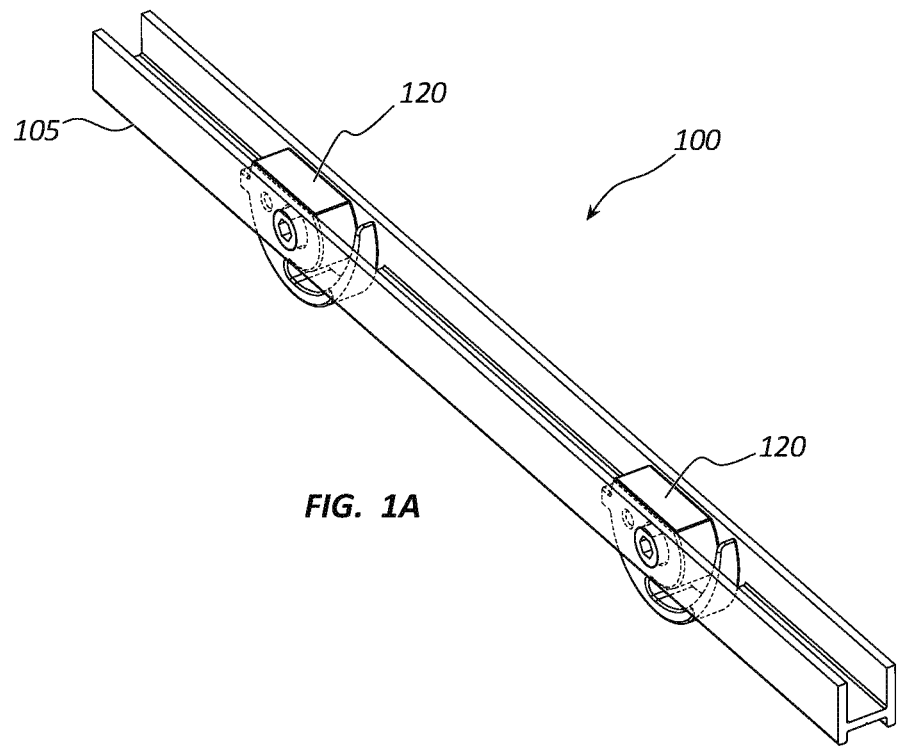
FIG. 1A is a perspective view of a rotatable cam fastener assembly.
Figure 1B:
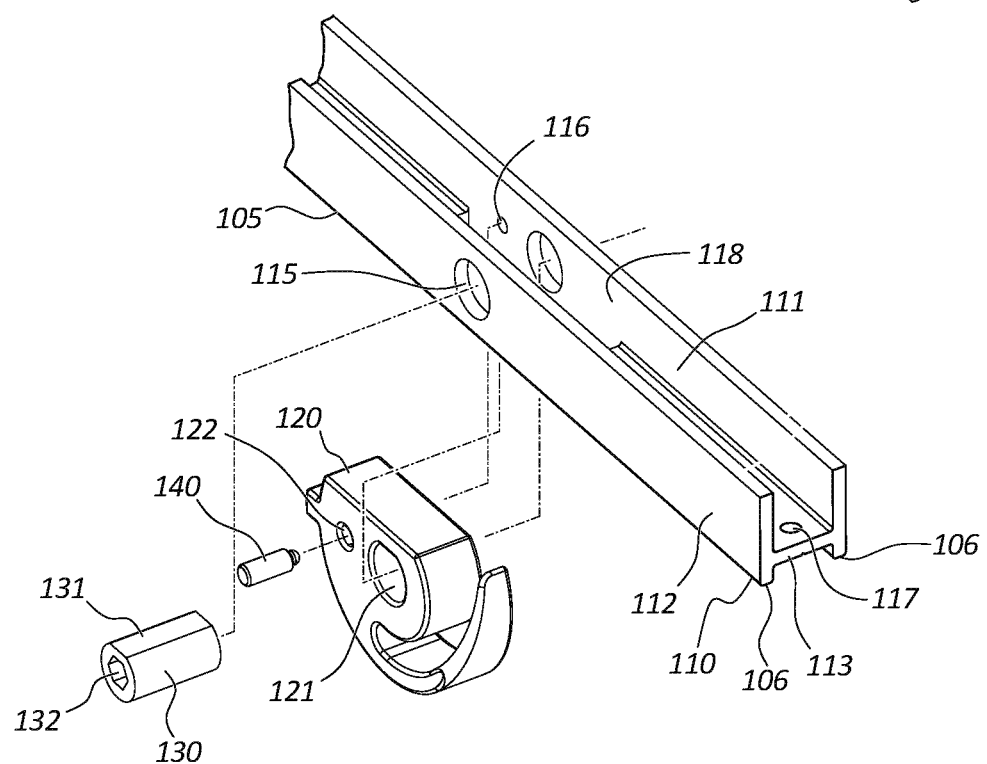
FIG. 1B is a perspective exploded view of a portion of the rotatable cam fastener assembly of FIG. 1A.
Figure 1C:
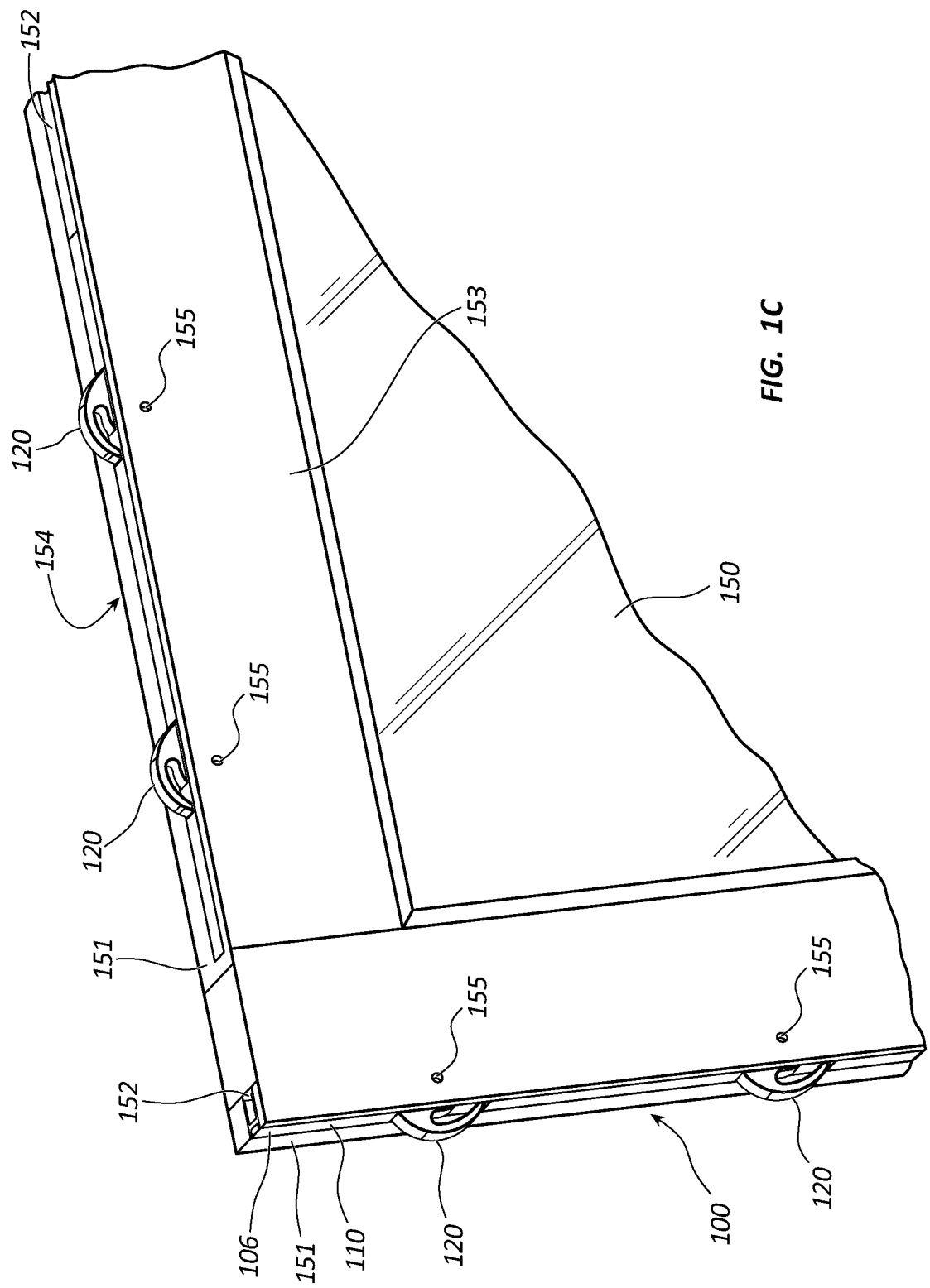
FIG. 1C is a perspective view of a corner of a panel having two rotatable cam fastener assemblies of FIG. 1A mounted along a perimeter edge.

FIGS. 1A, 1B, and 1C illustrate an embodiment of a rotatable cam fastener assembly 100. The rotatable cam fastener assembly 100 may be installed into a perimeter edge of a stationary (fixed) panel 150 for the purpose of providing a mechanism for fastening the panel 150 to a frame 503 (FIG. 5A) and establishing or adjusting a position of the panel 150 relative to the frame 503. Operation of rotatable cam fastener assembly 100 may be used to move the panel in one or more different directions, as further described below. One direction may be substantially parallel to the plane of the panel 150, and another direction may be substantially perpendicular to the plane of the panel 150. The rotatable cam fastener assembly 100 may be used to permanently or semi-permanently secure the panel 150 to the frame 503. Multiple rotatable cam fastener assemblies 100 may be installed into multiple edges of the frame 503. For example, multiple rotatable cam fastener assemblies 100 may be installed along three perimeter edges of a rectangular panel. In some instances, it may be advantageous to install rotatable cam fastener assemblies 100 adjacent the corners of a rectangular panel. The rotatable cam fastener assembly 100 may be configured to secure the panel to an inner perimeter surface of the frame. The rotatable cam fastener assembly 100 may be configured to engage complementary engagement features installed along the inner perimeter of the frame. In some embodiments, the complementary engagement features may be built into the frame and/or integral to the frame. In the illustrated embodiment, the complementary engagement features are incorporated into a receiver 300 (FIGS. 3A, 3B, 3C, 5B, 5C) configured to be attached to or more specifically installed along a portion of the inner perimeter surface of the frame 503. The rotatable cam fastener assembly 100 may be initially disposed in a non-engagement configuration wherein the rotatable cam fastener assembly 100 is disposed flush or recessed relative to a perimeter edge surface 151 (FIG. 4A-1) of the panel so that the panel 150 may be initially placed within the inner perimeter of the frame 503, and/or within a rabbet disposed along the inner perimeter of the frame 503, without the cam fastener assembly 100 interfering with the frame 503. After initial placement of the panel 150 within the frame 503, the rotatable cam fastener assembly 100 may be disposed in a securement configuration wherein the panel 150 is secured to the frame 503, as described and illustrated below with respect to FIGS. 4E-1, 4E-2, 5B and 5C. Securement may comprise securing one or more perimeter edges of the panel 150 to a portion of the inner perimeter surface of the frame 503. For example, three perimeter edges of a rectangular panel may be secured to three complementary inner perimeter surfaces of the frame. In some embodiments, the frame 503 may include a rabbet defining an adjacent ledge, soffit, or stop, which is configured to interface with one of the sides of the panel 150 along the perimeter edge. In some embodiments, multiple rotatable cam fastener assemblies 100 may be installed along a single edge of the panel 150. In some instances, the panel 150 may be initially placed within the frame 503 in a location offset from the desired final placement position. In such instances, the rotatable cam fastener assembly 100 may be used to move the panel into the final placement position.

Turning specifically to FIGS. 1A, 1B, and 1C, the rotatable cam fastener assembly 100 may comprise a chassis 105 supporting one or more rotatable cam fasteners 120. In the current embodiment, the rotatable cam fastener assembly 100 includes two rotatable cam fasteners 120 spaced apart along the chassis 105. In other embodiments (not illustrated), the rotatable cam fastener assembly 100 may include one rotatable cam fastener 120, or three or more rotatable cam fasteners 120 spaced apart along the chassis 105. The rotatable cam fastener assembly 100 may be configured to be installed in and coupled to a panel 150. More specifically, the chassis 105 may be pre-installed on the panel 150 along a perimeter edge 151 thereof within a groove or other recess 152 formed in the edge 151, such that the edges 106 of the chassis 105 are flush with, or recessed relative to, the perimeter edge 151 of the panel 150. The edges 106 of chassis 105 are located along an opening face 110 of chassis 105.

FIG. 1B is an exploded detail view of a portion of the rotatable cam fastener assembly 100 showing one of the two rotatable cam fasteners 120. The rotatable cam fastener 120 is rotatably coupled to the chassis 105. The chassis 105 comprises a first flange 111 and a second flange 112 coupled together by a web 113. The first flange 111 and the second flange 112 are spaced apart so as to slidably receive the rotatable cam fastener 120 therebetween. The first flange 111 and second flange 112 comprise coaxially aligned receiving holes 115 sized to slidably receive opposite ends of an axle 130. Portions of the web 113 may be omitted to provide for placement of one or more rotatable cam fasteners 120 between the first flange 111 and second flange 112. The web 113 may comprise a plurality of mounting holes 117 to facilitate mounting of the chassis 105 to panel 150 using a plurality of threaded fasteners, e.g. screws.

In a presently preferred embodiment, the rotatable cam fastener 120 comprises an axle-receiving hole 121 configured to receive the axle 130 therethrough and couple to the axle 130 so as to ensure co-rotation of the axle 130 and the rotatable cam fastener 120. The outside perimeter of the axle 130 and the inside perimeter of the hole 121 may comprise complementary features to facilitate co-rotation, for example key ways, splines, d-shapes, etc. In the current embodiment, the axle 130 comprises a flat perimeter portion 131 keyed to a flat surface 233 (FIG. 2B) within axle-receiving hole 121 to facilitate co-rotation. The axle 130 may also be coupled to the rotatable cam fastener 120 to inhibit longitudinal displacement of the axle 130 along the rotational axis of the axle relative to the rotatable cam fastener 120. The coupling may comprise a press fit, adhesives or any other suitable fastening method. In another embodiment (not illustrated), the axle 130 may be integrally formed with the cam fastener 120, and installed and retained in the chassis 105 in a somewhat different manner than illustrated. In a further embodiment (not illustrated), a rotational interface between the rotatable cam fastener 120 and the chassis 105 may include a pair of concentric hollow cylindrical protrusions extending inward from the first flange 111 and the second flange 112, and engaging a pair of concentric cylindrical recesses disposed on opposite sides of the rotatable cam fastener 120.

The axle 130 may be sized so that the ends of the axle 130 are substantially flush with outside surfaces of the first flange 111 and the second flange 112. The axle 130 may include a tool interface 132 at one or both ends. The tool interface 132 may accommodate any tool configured for applying torque to a fastener, for example a screw driver, a hex key, socket wrench, etc. In the embodiment illustrated, the tool interface 132 is a hex socket for receiving a hex key (Allen wrench). The rotatable cam fastener 120 may thus be rotated by an installer about an axis of rotation defined by the axle 130.

The chassis assembly 105 may comprise a detent mechanism for at least partially securing the rotatable cam fastener 120 in at least one angular position, e.g. an initial angular position. In the current embodiment, the rotatable cam fastener 120 comprises a detent mechanism in the form of a spring ball plunger 140 configured to engage a recess 116 disposed on an inner surface 118 of the first flange 111 such that when the spring ball plunger 140 is aligned and engaged with the recess 116, it inhibits inadvertent rotation of the rotatable cam fastener 120 in the absence of a torque applied by the installer via tool interface 132. In some embodiments, more than one recess 116 may be disposed on the inner surface 118, establishing more than one detent position of the rotatable cam fastener 120 angularly about the axis of rotation.

FIG. 1C illustrates a pair of rotatable cam fastener assemblies 100 installed along orthogonal perimeter edges 151 of a panel 150. In some embodiments, the rotatable cam fastener assemblies 100 may be installed within a groove or recess 152 disposed along a portion of the perimeter edge 151. The groove 152 may be sized so that the edges 106 of the chassis 105 and opening face 110 are aligned flush with or recessed beneath the perimeter edge 151. The chassis 105 may be secured to the panel 150 with the use of threaded fasteners (not shown) through mounting holes 117.

The panel 150 may comprise a plurality of orifices 155 disposed on and extending through the front side 153 of the panel 150 to the recess 152. More specifically, the plurality of orifices 155 may comprise an orifice adjacent each rotatable cam fastener 120 to provide access to the tool interface 132 of the axle 130. A torque tool (for example a hex key, screwdriver, etc.) may be inserted through the orifice 155 and engage the tool interface 132 of the axle 130. The torque tool may then be used to rotate the rotatable cam fastener 120. In some embodiments, the plurality of orifices 155 may be disposed on the rear side 154 and/or on both the front side 153 and the rear side 154. A removable plug or patch may be used to cover the orifices 155 after installation to improve the appearance of the panel 150 and prevent foreign matter from entering the orifices 155.

Figure 2A:
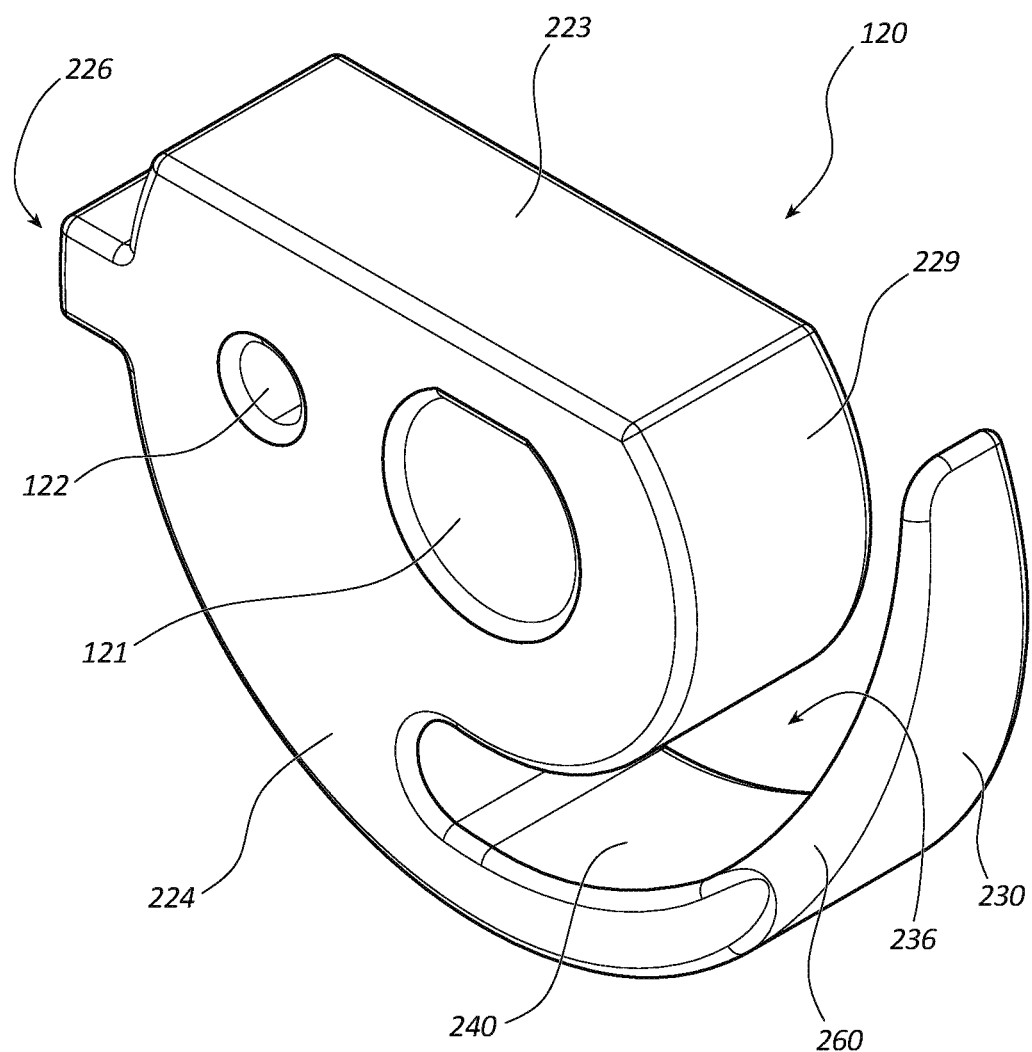
FIG. 2A is a perspective view of a rotatable cam fastener.
Figure 2B:
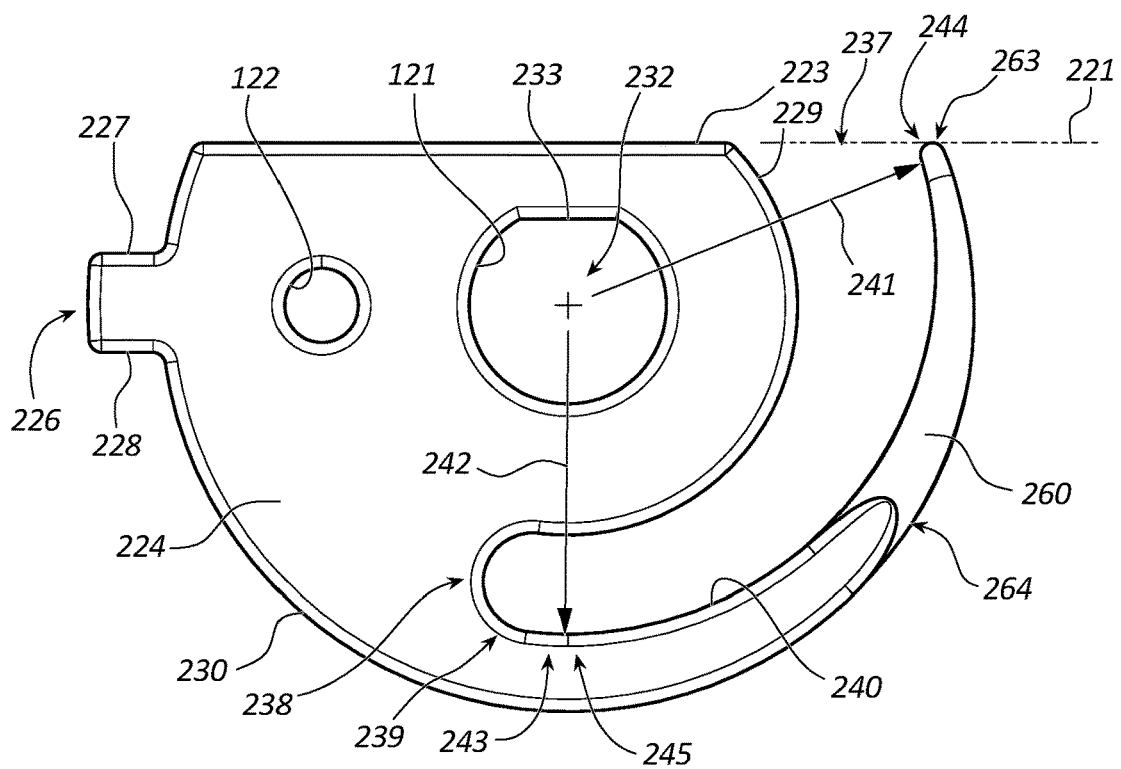
FIG. 2B is a front view of the rotatable cam fastener of FIG. 2A.
Figure 2C:
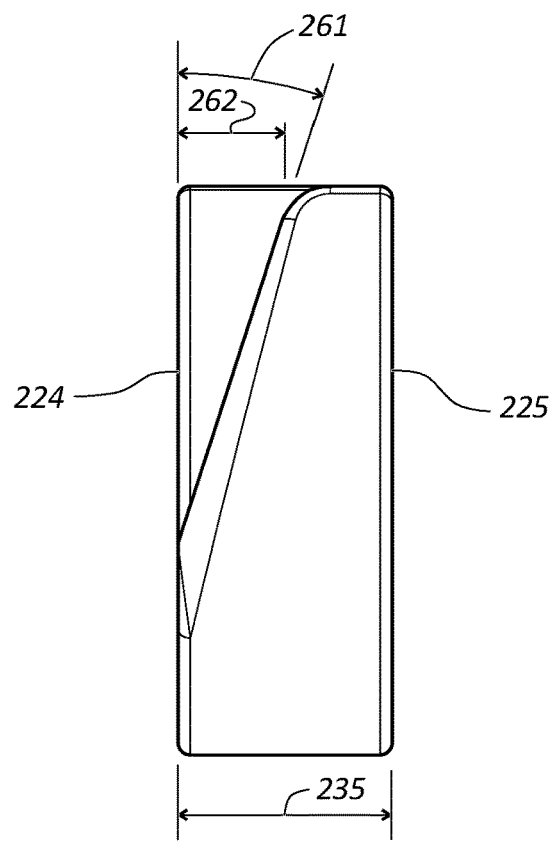
FIG. 2C is a side view of the rotatable cam fastener of FIG. 2A.

FIGS. 2A, 2B, and 2C illustrate further details of the rotatable cam fastener 120. The rotatable cam fastener 120 may comprise a disk-like shaped body having an axis of rotation 232 (FIG. 2B). The rotatable cam fastener 120 may comprise side surfaces disposed substantially perpendicular to the axis of rotation 232, including a first side 224 and a second side 225 (FIG. 2C) opposite the first side 224. The first side 224 and second side 225 may comprise flat and non-flat portions. The first side 224 may be spaced apart from the second side 225 by a thickness 235 (FIG. 2C) of the disk-shaped body. The thickness 235 may be between about 8 mm and about 20 mm for example. The rotatable cam fastener 120 may be formed of a metal or a high strength polymeric material, for example a high strength thermoplastic or thermoset material which may include reinforcement fibers.

The rotatable cam fastener 120 may comprise features and components disposed about an outer perimeter. The outer perimeter may comprise a curved outer surface 230 which in some embodiments may comprise a constant radius disposed about the axis of rotation 232. The outer perimeter may also comprise a flat portion 223 defining a plane 221 parallel to the axis of rotation 232. The flat portion 223 may be sized and positioned relative to the axis of rotation 232 so as to align with the edges 106 when the rotatable cam fastener 120 is properly oriented. In the current embodiment, the flat portion 223 may align with the opening face 110 of the chassis 105 between the edges 106 when the rotatable cam fastener 12.0 is disposed in the initial position.

Figures 1, 4A:
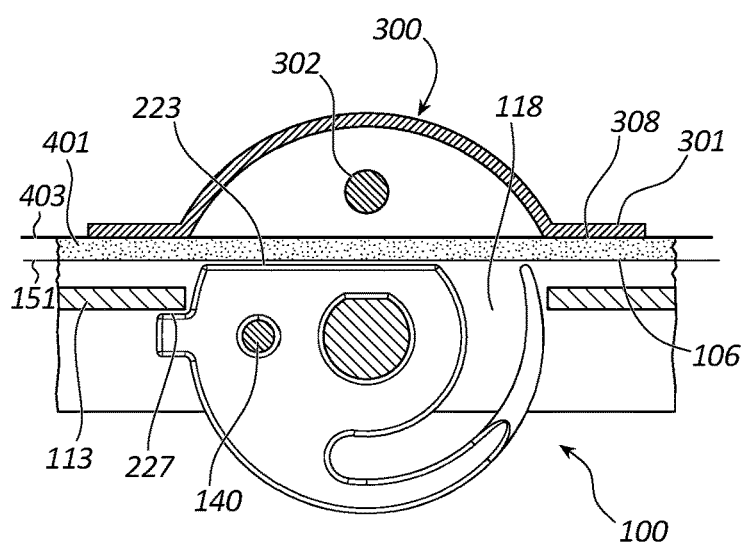
FIG. 4A-1 is a front cross-sectional view illustrating a fastening system including the rotatable cam fastener assembly of FIG. 1A and the receiver of FIG. 3A, with the rotatable cam fastener in an initial position prior to fastening.

The rotatable cam fastener 120 may comprise a rotational stop 226 disposed on and protruding from the curved outer surface 230. The rotational stop 226 may be configured to engage the web 113 of the chassis 105 to limit rotation of the rotatable cam fastener 120, as illustrated in FIGS. 4A-1 and 4E-1 described below. The rotational stop 226 may comprise a first stop surface 227 configured to engage web 113 when rotatable cam fastener 120 is rotated in a first direction and a second stop surface 228 opposite first stop surface 227 and configured to engage web 113 when rotatable cam fastener 120 is rotated in a second direction opposite the first direction of rotation. The rotatable cam fastener 120 may comprise a receiving hole 122 configured to establish a secure coupling of the spring ball plunger 140. The spring ball plunger 140 may be coupled to the rotatable cam fastener 120 via a press fit or any other suitable coupling method, for example an adhesive.

The rotatable cam fastener 120 may comprise a curved slot 236 disposed radially inward of the curved outer surface 230 extending between the first side 224 and the second side 225. The slot 236 may extend partially around the axis of rotation 232. The slot 236 may have an open end 237 and a closed end 238 so as to form a hook. The open end 237 may align with the plane 221, and the closed end 238 of the slot 236 may be opposite the flat portion 223. In other words, the closed end 238 may be oriented approximately 180 degrees away from the flat portion 223. The slot 236 may define an outward facing radial surface 229. The radial surface 229 may or may not comprise a constant radius about the axis of rotation 232 over the length of the slot 236.

The slot 236 may also define an inward facing radial cam surface 240 along the hook portion 243, having a variable radius about the axis of rotation 232. The radial cam surface 240 may comprise a distal end 244 disposed at the open end 237 of the slot 236 and a proximal end 245 disposed adjacent the closed end 238 of the slot 236. The radial cam surface 240 may have a maximum radius 241 from the axis of rotation 232 at the distal end 244 and a minimum radius 242 at the proximal end 245. The radial cam surface 240 may comprise a smooth transition between the maximum radius 241 and the minimum radius 242. The maximum radius 241 may exceed the minimum radius 242 by a distance between about 2 mm and about 7 mm, for example, or more. In some embodiments, the radial cam surface 240 may be defined by a constant radius eccentric circular arc extending about a point offset from the axis of rotation 232. The radial cam surface 240 may be configured to engage a cam follower 302 as described below with reference to FIGS. 3A to 3C, and 4A-1 to 4E-2. In some embodiments, the radial cam surface 240 may comprise protrusions and/or depressions, which in some instances may form one or more detents interacting with cam follower 302 or another detent-engaging structure.

The radial cam surface 240 may comprise a straight portion forming a portion of a detent 239 adjacent the closed end 238 such that a radius at the closed end 238 is greater than the minimum radius 242. A somewhat greater radius adjacent the closed end 238 may form a pocket that engages the cam follower 302 and forms the detent 239. The detent 239 may inhibit inadvertent rotation of the rotatable cam fastener 120 away from the fully fastened position in the absence of a torque applied by the installer, for example inhibiting inadvertent rotation due to vibration or settling of components.

The rotatable cam fastener 120 may also comprise a helical cam surface 260 disposed substantially orthogonal to the radial cam surface 240. The helical cam surface 260 may comprise a ramped surface sloping away from the first side 224 and toward the second side 225, and having an angle of inclination 261 (FIG. 2C). The angle of inclination 261 may be between about 10 degrees and 30 degrees, for example, or a greater or lesser angle. The helical cam surface 260 may intersect or blend into the first side 224 at a proximal end 264 of the helical cam surface 260. The helical cam surface 260 may be positioned radially outward of the slot 236. In other words, the helical cam surface 260 may comprise a portion of the first side 224 between the radial cam surface 240 and the curved outer surface 230. In another embodiment (not illustrated) the helical cam surface may be formed wholly or partially on a central region of the body radially inward of the slot 236 and counter-clockwise of distal end 244 of the radial cam surface 240 and the hook portion. The helical cam surface 260 may be flat or curved. The helical cam surface 260 may intersect the plane 221 at a distal end 263. The distal end 263 of the helical cam surface 260 may be disposed away from the first side 224 by a distance 262. The distance 262 may be between about 5 mm and about 15 mm, for example, or a lesser distance that less than the thickness 235 of cam fastener 120. In an alternative left-handed embodiment (not illustrated), the helical cam surface 260 may intersect the second side 225 at the proximal end 264 and incline toward the first side 224. In some embodiments, the distal end 263 of the helical cam surface 260 may be adjacent the distal end 244 of the radial cam surface 240.

Figure 3A:
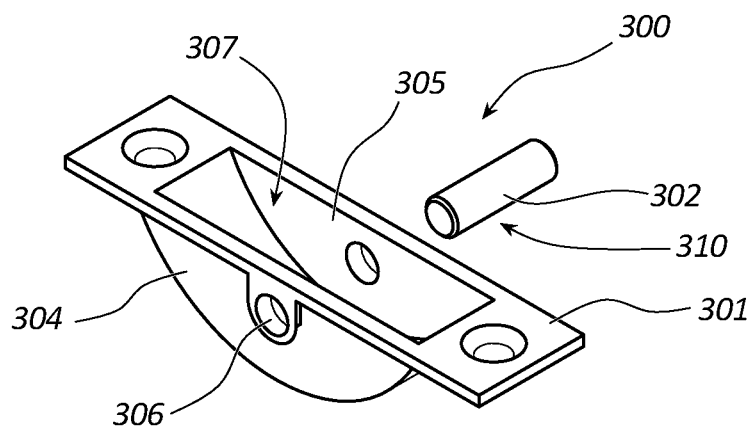
FIG. 3A is an exploded perspective view of a receiver configured for engagement with the rotatable cam fastener of FIG. 2A.
Figure 3B:
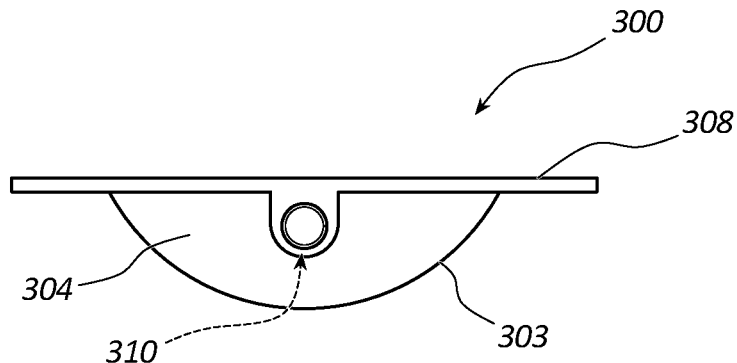
FIG. 3B is an assembled side view of the receiver of FIG. 3A.
Figure 3C:
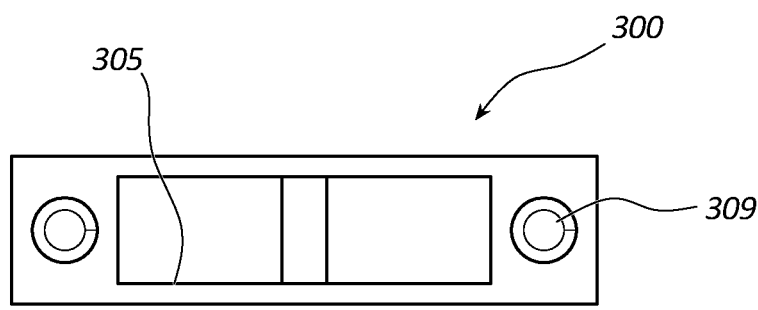
FIG. 3C is an assembled top view of the receiver of FIG. 3A.

A rotatable cam fastener system may comprise one or more rotatable cam fastener assemblies 100 combined with one or more receivers. FIGS. 3A, 3B, and 3C illustrate a receiver 300. The receiver 300 may be configured to engage a rotatable cam fastener 120. The receiver 300 may comprise a flange 301 having mounting holes 309 and a top surface 308. The receiver 300 may comprise side walls 304 and a perimeter wall 303 defining a receiver cavity 307. The receiver 300 may be installed in a frame 503 such that the top surface 308 is flush with, or recessed relative to, an inner perimeter surface 403 (FIG. 4A-1) of the frame. The receiver 300 may be of unitary construction comprising a rigid material, for example aluminum or steel. The receiver 300 may comprise a helical cam-engaging receiver surface 305 (also referred to as a helical cam receiving surface or, simply, a receiver surface). The receiver surface 305 may be an inner surface of one of the side walls 304, and may be flat or curved. The receiver surface 305 may be configured to slidably engage the helical cam surface 260 of the rotatable cam fastener 120.

The receiver 300 may comprise a cam follower in the form of a cross bar 302 or other catch. The cross bar 302 may comprise a radial cam receiving surface 310 configured to engage the radial cam surface 240 of the rotatable cam fastener 120. The cross bar 302 may be disposed laterally across the cavity 307 and be rigidly coupled to the cavity side walls 304. The cross bar 302 may be of any rigid construction disposed laterally between the cavity walls 304 and may comprise any cross-sectional shape. The cam receiver 300 may be configured such that all of the cross bar 302 is substantially disposed within the cavity 307, i.e., recessed relative to top surface 308. The cross bar 302 may comprise a separate component such as a cylindrical rod or pin. The rod or pin may be solid or hollow, for example a roll pin. The cavity side walls 304 may comprise coincident orifices 306 configured to receive opposite ends of the cross bar 302. The coupling of the cross bar 302 to one or both of the orifices 306 may comprise a press fit or sliding fit. In some embodiments, the side walls 304 and cross bar 302 may be integrally formed. The radial cam receiving surface 310 may be disposed on a side of the cross bar 302 opposite the flange 301 and facing toward the perimeter wall 303. In some embodiments the cross bar 302 may be omitted from the receiver 300.

In some embodiments, the engagement features of the receiver 300—i.e. the cross bar 302 comprising the radial cam receiving surface 310 and the receiver surface 305—may be integral to the frame 503. For example, the receiver surface 305 may be an edge of an opening in the inner perimeter wall of a frame 503. Similarly, the cross bar 302 may be installed in the frame 503 directly.

In some embodiments, a plurality of rotatable cam fastener assemblies 100 combined with a complementary plurality of receivers 300 may define a rotatable cam fastener system. The rotatable cam fastener system may be employed to attach, secure or otherwise couple a fixed panel to a frame. The rotatable cam fastener system may also be used to move the fixed panel from an initial placement position to a final placement position. Movement of the panel may comprise displacement in at least two substantially orthogonal movement vectors or directions, or in a single composite direction, such as a diagonal direction angled relative to both the panel 150 and the axis of rotation 232 of the rotatable cam fastener 120.

Figures 2, 4A:
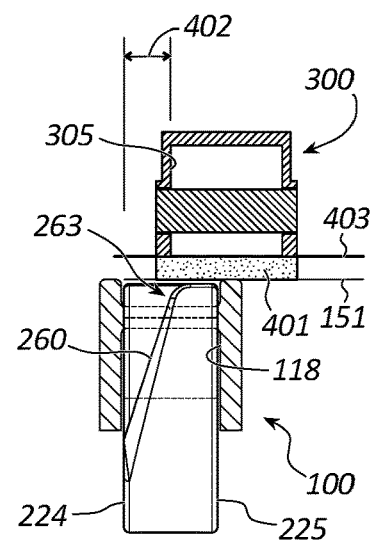
Figures 1, 4B:
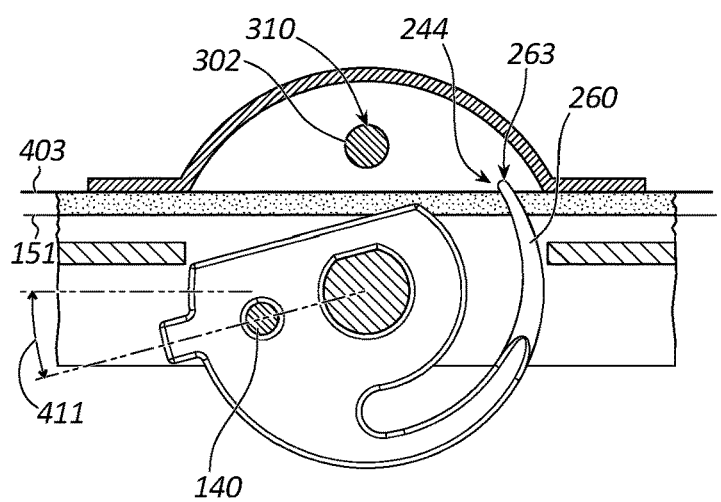
Figures 2, 4B:
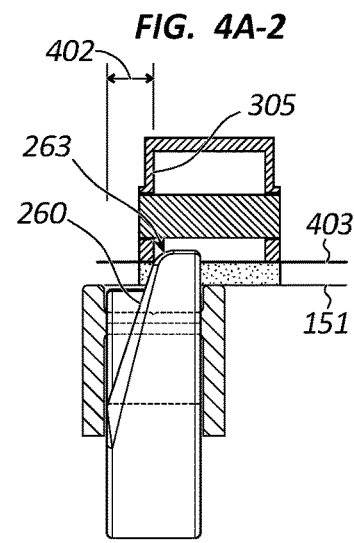
Figures 1, 4C:
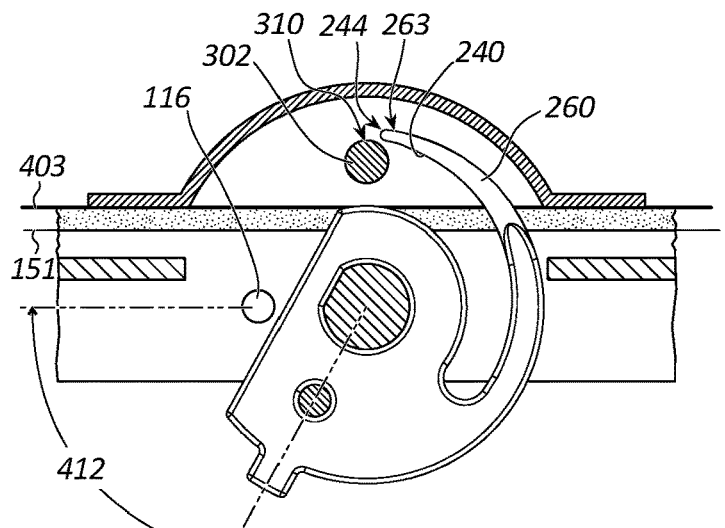
Figures 2, 4C:
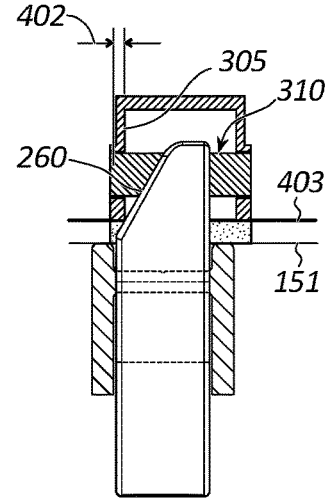
Figures 1, 4D:
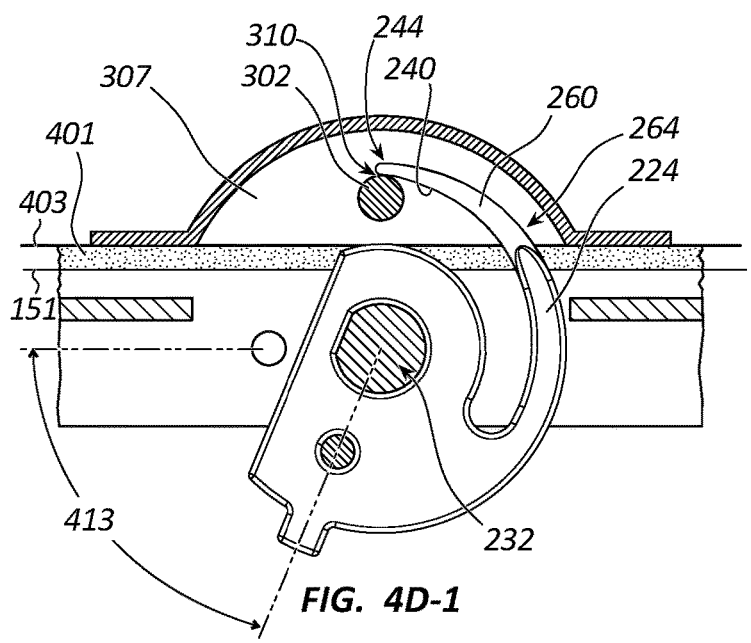
Figures 2, 4D:
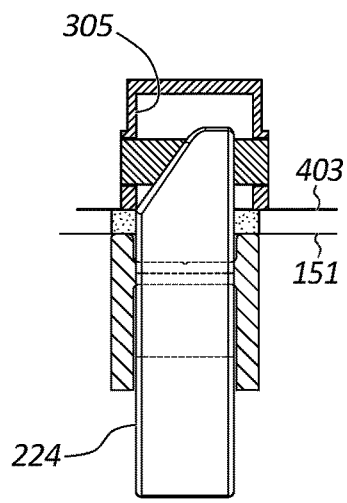
Figures 1, 4E:
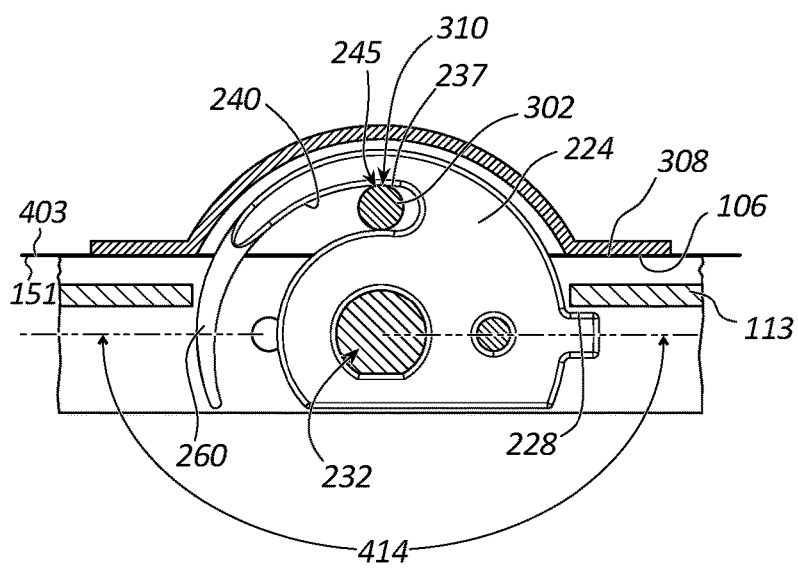
Figures 2, 4E:
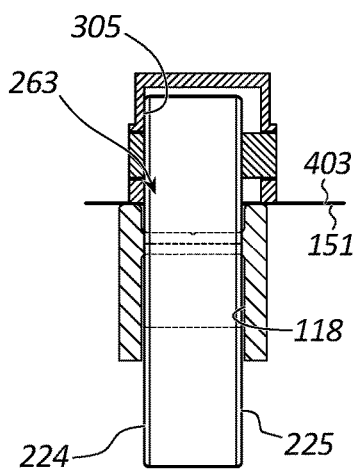
Figure 5A:
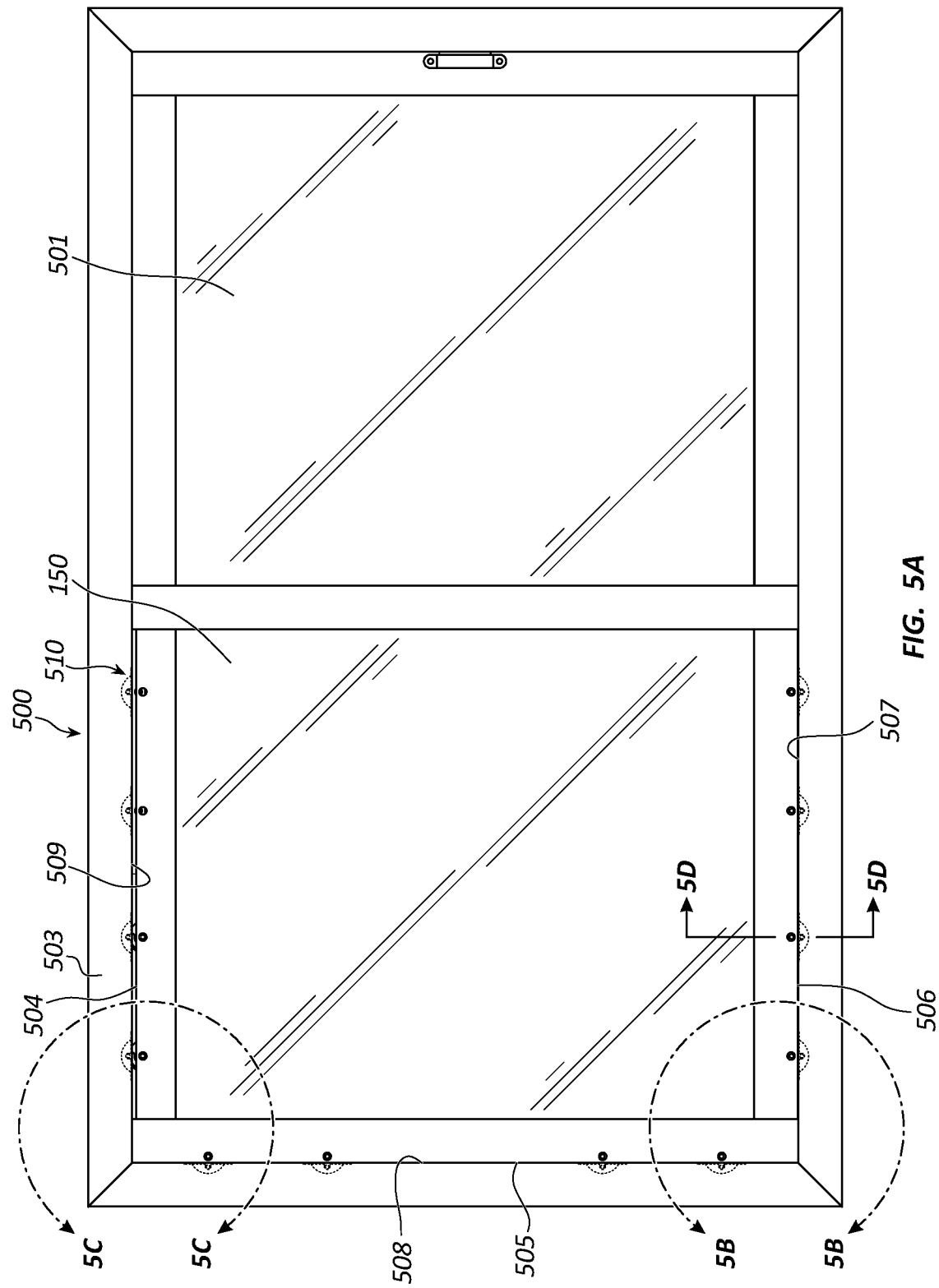
FIG. 5A is a front view of a panel assembly having a fixed panel secured to the frame via a plurality of fastener assemblies of FIG. 1A coupled to a plurality of complementary receivers of FIG. 3A.

FIGS. 4A-1 through 4E-2 illustrate the operation of the rotatable cam fastener 120 as may be installed in a perimeter edge 151 of a panel 150 (FIGS. 1C and 5A), and its engagement with the cam receiver 300 as may be installed substantially flush with an inner perimeter surface 403 of a frame 503 (FIG. 5A). FIGS. 4A-1 through 4E-2 show sequential steps of operation. FIGS. 4A-1, 4B-1, 4C-1, 4D-1 and 4E-1 illustrate the steps from a front view perspective, and FIGS. 4A-2, 4B-2, 4C-2, 4D-2 and 4E-2 show the respective steps from a side view perspective. An initial gap 401 between the edges 106 of the chassis 105 and the top surface 308 of the receiver flange 301 or in other words between the perimeter edge 151 of the panel 150 and the inner perimeter surface 403 of the frame is shown in FIG. 4A-1. In some instances, the gap 401 may be caused by a compressible seal disposed between the perimeter edge 151 of the panel 150 and inner perimeter surface 403 of the frame. In other instances, the gap 401 may not be present. An initial lateral alignment offset 402 is also shown in FIG. 4A-2. In some instances, the lateral alignment offset 402 may be caused by a compressible seal disposed between a side of the panel and a ledge of the frame. In some instances, the lateral alignment offset 402 may not be present.

FIGS. 4A-1 and 4A-2 illustrate an operational step 1 with the rotatable cam fastener 120 disposed in an initial angular position which may in some instances represent a fixed panel initially placed within a frame. The rotatable cam fastener 120 is shown in a fully clockwise orientation with the stop surface 227 of rotational stop 226 in contact with the web 113 of chassis 105. For illustration purposes, FIGS. 4A-1 and 4A-2 define an angular orientation of zero degrees for the rotatable cam fastener 120. As illustrated, the flat portion 223 is in alignment with the edges 106 and the perimeter edge 151. In the operational step 1, the rotatable cam 120 is completely disposed within the perimeter edge 151 of the panel 150, facilitating initial placement of the panel 150 within the inner perimeter surface 403 of the frame.

FIGS. 4B-1 and 4B-2 illustrate an operational step 2 with the rotatable cam fastener 120 rotated counter-clockwise at an angle 411. In this illustrated orientation, the rotatable cam fastener 120 is protruding from the surface of the perimeter edge 151 and the rotatable cam fastener 120 is in initial engagement with the receiver 300. More specifically, as illustrated in FIG. 4B-2, the distal end 263 of the helical cam surface 260 is in initial contact with the receiver surface 305. As illustrated in FIG. 4B-1, radial cam surface 240 is disengaged from the radial cam receiving surface 310 of the cross bar 302.

FIGS. 4C-1 and 4C-2 illustrate an operational step 3 with the rotatable cam fastener 120 rotated counter-clockwise at an angle 412. In this illustrated orientation, the rotatable cam fastener 120 is in further engagement with the receiver 300 relative to FIGS. 4B-1 and 4B-2. More specifically, as illustrated in FIG. 4C-1, the distal end 244 of the radial cam surface 240 is in initial engagement with the radial cam receiving surface 310 of cross bar 302. As illustrated in FIG. 4C-2, the helical cam surface 260 is in further engagement with the receiver surface 305. More specifically, the engagement point of the receiver surface 305 is further disposed along the helical cam surface 260. As such, a contact force between the receiver surface 305 and the helical cam surface 260 has displaced the panel 150 in a lateral direction reducing the lateral offset 402.

FIGS. 4D-1 and 4D-2 illustrate an operational step 4 with the rotatable cam fastener 120 rotated counter-clockwise at an angle 413. In this illustrated orientation, the rotatable cam fastener 120 is in further engagement with the receiver 300 relative to FIGS. 4C-1 and 4C-2. More specifically, as illustrated in FIG. 4D-1, the radial cam surface 240 is in further engagement with the radial cam receiving surface 310. As such, a contact force between the radial cam surface 240 and the radial cam receiving surface 310 may cause the panel 150 to be displaced in a direction parallel to the panel 150. More specifically, the cross bar 302 may be displaced toward the axis of rotation 232 of the rotatable cam fastener 120 reducing the gap 401. As illustrated in FIG. 4D-1, helical cam surface 260 is fully disposed within cavity 307, and is no longer in contact with the receiver surface 305. In other words, the proximal end 264 is displaced beyond the receiver surface 305 such that the first side 224 is in engagement with the receiver surface 305. As such, the lateral offset 402 is fully reduced and displacement of the panel 150 in the lateral direction is complete. The difference between the angle 413 and the angle 411 may define a first angle of rotation.

FIGS. 4E-1 and 4E-2 illustrate a final operational step 5 with the rotatable cam fastener 120 rotated fully counter-clockwise at an angle 414. In this illustrated orientation, the rotatable cam fastener 120 is in final engagement with the receiver 300. More specifically, as illustrated in FIG. 4E-1, the radial cam surface 240 is in final engagement with the radial cam receiving surface 310. As such, the contact force between the radial cam surface 240 and the radial cam receiving surface 310 has caused the panel 150 to be finally displaced in a direction parallel to the panel. More specifically, the cross bar 302 is fully displaced toward the axis of rotation 232 of the rotatable cam fastener 120 and the gap 401 illustrated in FIG. 4D-1 is fully reduced. As illustrated in FIG. 4E-2, the receiver surface 305 is in further engagement with the first side 224. As such, displacement of the panel 150 in the lateral direction is the same relative to FIGS. 4D-1 and 4D-2. The difference between the angle 414 and the angle 412 may define a second angle of rotation.

As may be obvious to one of ordinary skill in the art having the benefit of this disclosure, modifications to the sequence of panel displacement may be defined by adjusting the shapes and/or relative positions of the radial cam surface 240 and the helical cam surface 260. As illustrated in FIGS. 4A-1 through 4E-2, in the illustrated embodiment, lateral displacement of the panel 150 is substantially complete prior to displacement of the panel 150 in a direction parallel to the plane of the panel 150. In other embodiments, lateral displacement and parallel displacement may substantially overlap or occur simultaneously, thereby moving the panel 150 along a composite diagonal direction. In further embodiments, parallel displacement may occur prior to lateral displacement or vice versa, depending on the relative angular locations of the radial cam surface 240 and helical cam surface 260 or their respective cam receiving surfaces 310 and 305. While the operational direction of rotation of the rotatable cam fastener 120 is illustrated as counter-clockwise, a clockwise operational direction of rotation of the rotatable cam fastener 120 is also contemplated and encompassed by the present disclosure.

FIGS. 5A to 5E illustrate a fenestration panel assembly 500. Shown in FIG. 5A are a sliding panel 501, a (fixed) panel 150, and a frame 503. Panel 150 comprises three perimeter edges: a top edge 504, a side edge 505, and a bottom edge 506. Each of the three fixed panel edges 504, 505, 506 supports a pair of rotatable cam fastener assemblies 100, and each rotatable cam fastener assembly 100 includes a pair of rotatable cam fasteners 120. In alternative embodiments, fewer or greater numbers of cam fastener assemblies 100 or cam fasteners 120 may be employed. Spaced apart along the inner perimeter of the frame 503 are twelve cam receivers 300 located such that each receiver 300 is aligned with a rotatable cam fastener 120 when the panel 150 is moved into position in the frame 503 for installation.

Figure 5B:
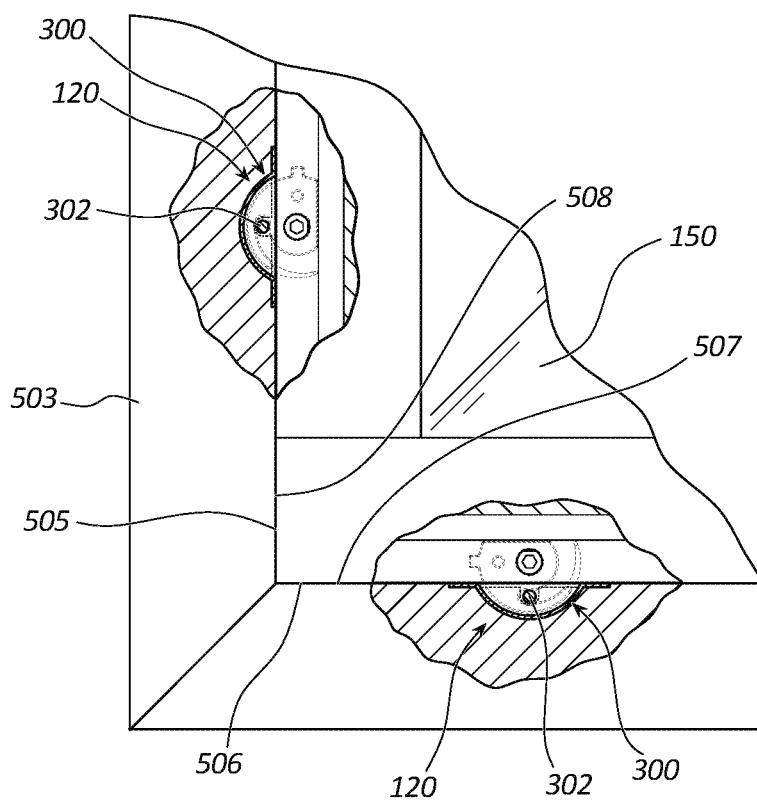
FIG. 5B is a detail view of a lower left corner of the panel assembly of FIG. 5A.

FIG. 5B is a detail view of the lower left corner of the panel 150 including two rotatable cam fasteners 120 coupled with two cam receivers 300. Each of the rotatable cam fasteners 120 are shown in the secured configuration, i.e. rotated fully counter-clockwise. The bottom edge 506 is shown in contact with the bottom inner perimeter 507 of the frame 503, and the side edge 505 is shown in contact with the left inner perimeter 508 of the frame 503.

Figure 5C:
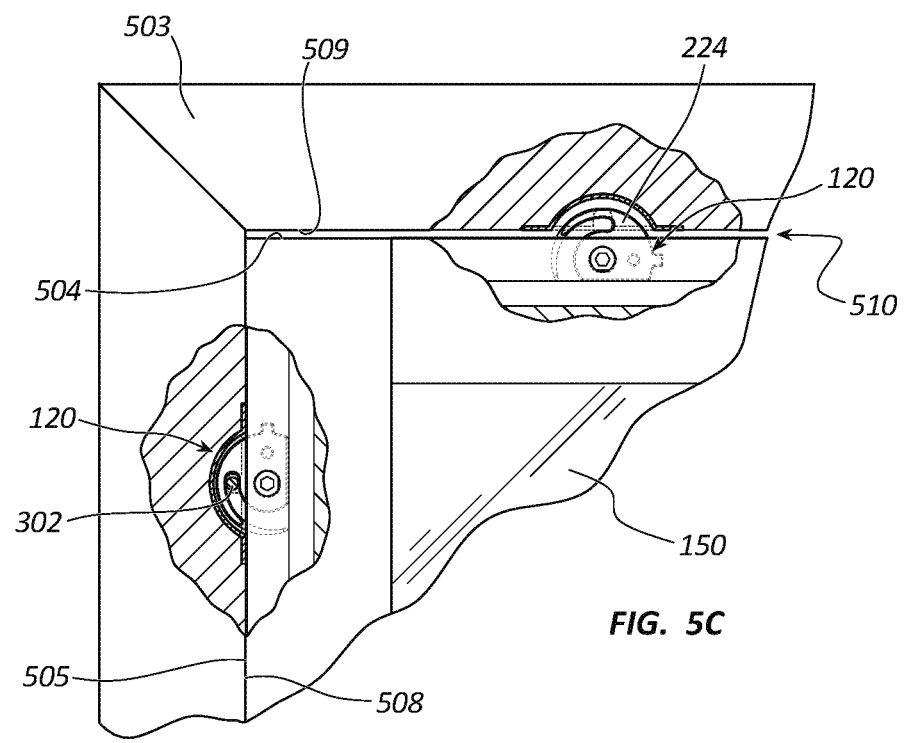
FIG. 5C is a detail view of an upper left corner of the panel assembly of FIG. 5A.

FIG. 5C is a detail view of the upper left corner of the panel 150 including two rotatable cam fasteners 120 coupled with two cam receivers 300. Each of the rotatable cam fasteners 120 are shown in the secured configuration, i.e., rotated fully counter-clockwise. The side edge 505 is shown in contact with the left inner perimeter 508 of the frame 503. The top edge 504 is shown having a gap 510 between the top edge 504 and the top inner perimeter 509 of the frame 503. In some instances, the frame opening dimensions may be larger than the panel dimensions. In the current illustration, the inner frame height dimension is greater than the panel height dimension, leaving the gap 510 between the top edge 504 and the top inner perimeter 509 of the frame 503. In the illustrated instance, the gap 510 prevents the radial cam surface 240 from drawing the top edge 504 in contact with the top inner perimeter 509. Hence, in the illustrated instance, the cross bar 302 has been omitted from the cam receiver 300 at the top of the frame 503 so that the rotatable cam fastener 120 may be fully rotated counter-clockwise to facilitate lateral positioning of the top edge 504 of the panel 150 without suspending the panel 150 from the frame 503.

Figure 5D:
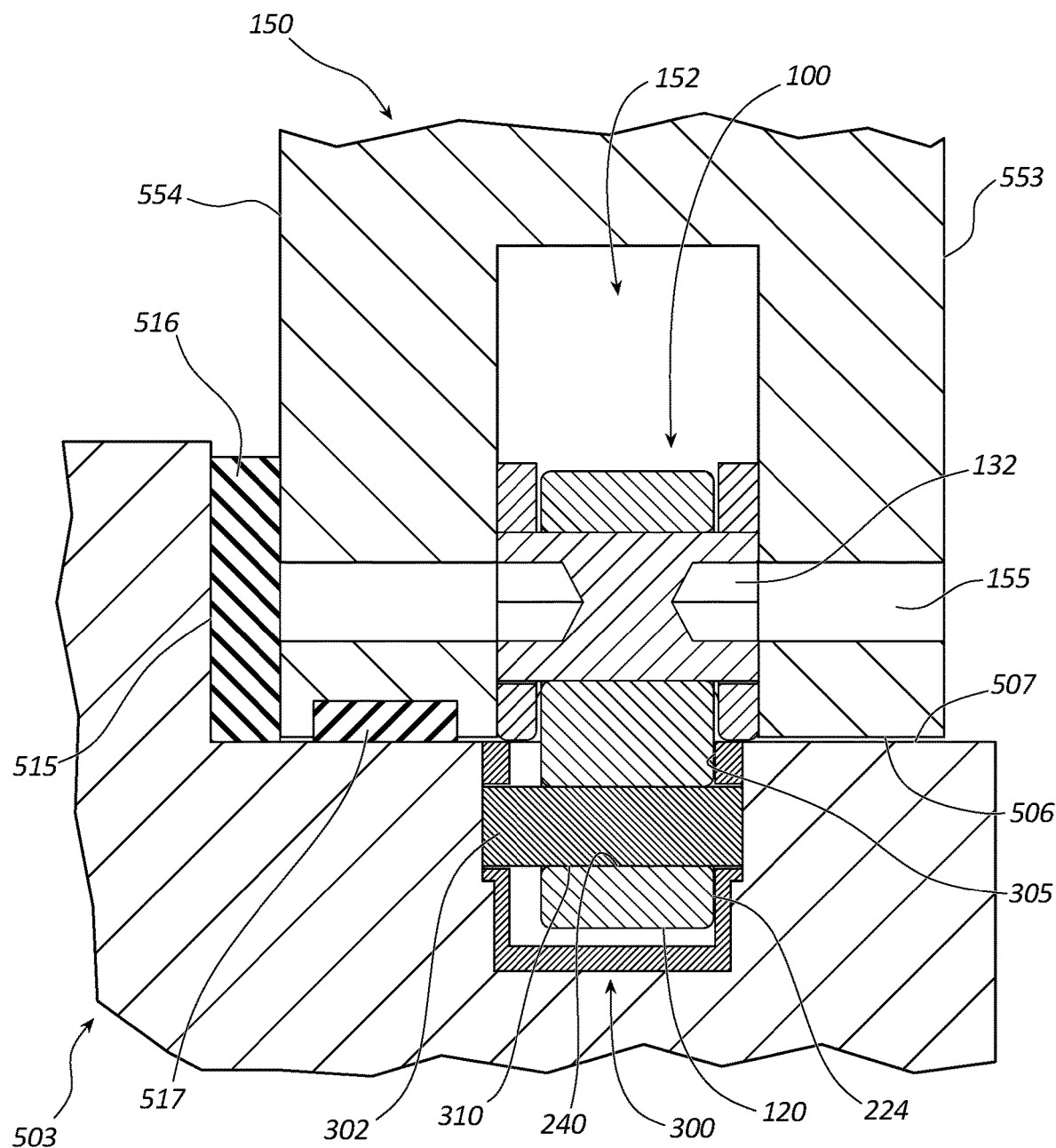
FIG. 5D is a cross-sectional detail view of the panel assembly of FIG. 5A cut along sectioning lines 5D-5D in FIG. 5A.

FIG. 5D is a cross-sectional view of the panel assembly 500 cut along sectioning lines 5D-5D. A rear side 554 of the panel 150 is shown opposite a front side 553. Frame 503 is shown having a rabbet adjacent a ledge 515. A first seal 516 may be compressed between the rear side 554 of panel 150 and the ledge 515 of frame 503. The first seal 516 may exert a force on the panel 150 directed perpendicular (i.e., lateral) to the panel 150, which may be overcome by a reaction force between the helical cam surface 260 or first side 224 of the rotatable cam fastener 120 and the receiver surface 305 of receiver 300. In other words, a force between the helical cam surface 260 or first side 224 of the rotatable cam fastener 120 and the receiving surface 305 maintains compression of the seal 516. In some embodiments, the ledge 515 may be disposed adjacent the front side 553 of the panel 150, and the rotatable cam fastener 120 may be configured to move the panel 150 toward the front side 553 upon rotation of the rotatable cam fastener 120.

A second seal 517 may be disposed between the bottom edge 506 of the panel 150 and the inner perimeter surface 507 of frame 503. The second seal 517 may exert a force on the panel 150 in a direction parallel to the panel 150, which may be overcome by a force between the radial cam surface 240 and the radial cam receiving surface 310 of cross bar 302. A similar side edge seal may be provided along the side edge 505 of panel 150.

A method of use of the rotatable cam fastener assembly 100 may comprise several steps or processes. The description of the steps or processes below is not intended to be all-inclusive or to define an order of operation unless specifically stated. The method of use may comprise some or all of the following steps or processes:

Providing one or more rotatable cam fastener assemblies.

Forming grooves, sized in width and length for receiving the rotatable cam fastener assemblies, into the perimeter edges of the panel at predefined locations so as to receive the one or more rotatable cam fastener assemblies.

Attaching the one or more rotatable cam fastener assemblies to the panel within the grooves.

Forming orifices through at least one side of the panel extending to the groove to be in alignment with the rotatable cam fasteners providing access to the axles for a torque tool.

Rotating each rotatable cam fastener to a first limited angular position such that the rotatable cam fastener is recessed relative to an adjacent perimeter edge of the panel.

Rotating each rotatable cam fastener into a first detent position.

Providing a plurality of receivers wherein each of at least a portion of the plurality of receivers comprises a first cam receiving surface and a second cam receiving surface.

Providing a plurality of receivers wherein a first portion of the plurality of receivers comprises a first cam receiving surface and a second cam receiving surface and wherein a second portion of the plurality of receivers comprises only one of a first cam receiving surface and a second cam receiving surface.

Attaching the plurality of receivers to the frame along a portion of an inner perimeter surface of the frame such that each receiver is positioned to be in alignment with a rotatable cam fastener.

Attaching a seal to at least one side of the panel along at least a portion of the perimeter and/or attaching a seal to a ledge disposed along at least a portion of an inner perimeter surface of the frame.

Attaching a seal to the perimeter edge of the panel along at least a portion of the perimeter edge and/or attaching a seal to the inner perimeter surface of the frame along at least a portion of the inner perimeter of the frame.

Placing the panel within the frame at an initial position.

Inserting a tool through each orifice.

Engaging a tool interface disposed on each rotatable cam fastener with the tool.

Rotating each rotatable cam fastener away from the first detent position.

Rotating each rotatable cam fastener so as to engage a first cam surface of the rotatable cam fastener with a first cam receiving surface of an adjacent receiver.

Moving the panel in a first direction by at least partially rotating each rotatable cam fastener.

Rotating each rotatable cam fastener so as to engage a second cam surface of the rotatable cam fastener with a second cam receiving surface of the adjacent receiver.

Moving the panel in a second direction by at least partially rotating each rotatable cam fastener wherein the second direction is substantially orthogonal to the first direction.

Rotating each rotatable cam fastener to a second limited angular position.

Rotating each rotatable cam fastener into a second detent position.

Rotating each rotatable cam fastener away from the second detent position into the first detent position.

Removing the panel from the frame.

It will be obvious to those having skill in the art that many changes may be made to the details of the above-described embodiments without departing from the underlying principles of the invention. The scope of the present invention should, therefore, be determined only by the following claims.

The invention claimed is:

1. A system attaching a fenestration panel to a frame, the panel comprising opposing front and rear sides having a thickness therebetween, and the frame comprising an opening sized to receive the panel and having a ledge surface extending inwardly from an inner perimeter of the opening, the system comprising:

a fastener rotatably coupled to one of an outer perimeter of the panel or the inner perimeter of the frame for rotation about an axis of rotation between a first position and a second position, the axis of rotation disposed transverse to the front and rear sides of the panel, the fastener comprising:

a first side and a second side, the axis of rotation of the fastener intersecting the first side and the second side, the first side including an axially facing surface that is flat and perpendicular to the axis of rotation, a thickness direction of the fastener defined between the first side and the second side, a slot that is open at the first side and the second side to define a hook, the slot including an inward facing radial cam surface having a decreasing radius in a first angular direction of the fastener about the axis of rotation, and the hook including a helical cam surface that is ramped in the thickness direction and that is helical with respect to the axis of rotation, the helical cam surface intersecting and blending into the axially facing surface of the first side; and a receiver coupled to the other one of the outer perimeter of the panel or the inner perimeter of the frame, such that the receiver is able to be in alignment with the fastener, the receiver comprising:

a cavity comprising a receiver surface proximate to the ledge surface, the hook received in the cavity when in the first position, the hook disposed outside the cavity when in the second position, the receiver surface positioned to contact and follow the helical cam surface as the fastener moves between the first position and the second position, and a cross member extending across the cavity from the receiver surface and defining a cam follower positioned to contact and follow the radial cam surface as the fastener moves between the first position and the second position, wherein upon rotation of the fastener from the second position to the first position, a contact force between the radial cam surface and the cam follower moves the panel relative to the frame in a first direction perpendicularly toward the axis of rotation, and a contact force between the helical cam surface and the receiver surface moves the panel relative to the frame in a second direction along the axis of rotation toward the ledge surface.

2. The system of claim 1, wherein:

the fastener is rotatable through a first angle of rotation and a second angle of rotation when moving from the second position to the first position, and rotation of the fastener through the first angle of rotation moves the panel in the first direction and rotation of the fastener through the second angle of rotation moves the panel in the second direction.

3. The system of claim 2, wherein the first angle of rotation and the second angle of rotation at least partially overlap.

4. The system of claim 3, wherein at least a portion of the second angle of rotation precedes the first angle of rotation.

5. The system of claim 1, further comprising a chassis mountable within a recess disposed along a perimeter edge of the panel, such that a top edge of the chassis is flush with or recessed beneath the perimeter edge, and wherein the fastener is rotatably coupled to the chassis.

6. The system of claim 5, wherein the fastener comprises a curved surface disposed partially about the axis of rotation defining a portion of a perimeter of the fastener.

7. The system of claim 6, wherein:
the fastener comprises a protrusion extending radially from the curved surface, and
the protrusion engages the chassis to limit rotation of the fastener.

8. The system of claim 5, wherein the fastener comprises a flat surface disposed parallel to the axis of rotation defining a portion of the perimeter of the fastener, the flat surface positioned relative to the axis of rotation so as to be aligned with the top edge of the chassis when the fastener is disposed at an initial angular position.

9. The system of claim 8, wherein the fastener comprises a detent, the detent inhibiting rotation of the fastener away from the initial angular position in the absence of a torque applied by a tool.

10. The system of claim 5, wherein:
the fastener comprises an axle fixedly coupled to the fastener coincident with the axis of rotation, and
the axle is rotatably coupled to the chassis.

11. The system of claim 10, wherein the axle comprises a tool interface disposed on one or both ends of the axle to facilitate application of a torque to the fastener via a tool.

12. A fenestration assembly comprising:
a panel comprising a front side, a rear side opposite the front side, and a thickness between the front side and the rear side;
a frame comprising an opening sized to receive the panel, the frame having a ledge surface extending inwardly from an inner perimeter of the opening;
at least one rotatable cam fastener disposed along at least a portion of an outer perimeter of the panel between the front and rear sides, the at least one rotatable cam fastener supported for rotation about an axis of rotation relative to the panel between a first position and a second position, the axis of rotation disposed transverse to the front and rear sides of the panel, the at least one rotatable cam fastener comprising:
a first side and a second side, the axis of rotation of the at least one rotatable cam fastener intersecting the first side and the second side, the first side including an axially facing surface that is flat and perpendicular to the axis of rotation, a thickness direction of the rotatable cam fastener defined between the first side and the second side, the axis of rotation disposed perpendicular to the panel,
a slot that is open at the first side and the second side to define a hook, the slot including a radial cam surface having a decreasing radius in a first angular direction of the fastener about the axis of rotation, and the hook including a helical cam surface that is ramped in the thickness direction and that is helical with respect to the axis of rotation, the helical cam surface intersecting and blending into the axially facing surface of the first side; and
at least one receiver disposed along at least a portion of the inner perimeter of the frame, such that the at least one receiver is positioned to be in alignment with the at least one rotatable cam fastener, the at least one receiver comprising:
a cavity comprising a receiver surface proximate to the ledge surface of the at least one receiver, the hook received in the cavity when in the first position, the hook disposed outside the cavity when in the second position, the receiver surface positioned to contact and follow the helical cam surface as the fastener moves between the first position and the second position, and
a cross member extending across the cavity from the receiver surface and defining a cam follower positioned to contact and follow the radial cam surface as the at least one rotatable fastener moves between the first position and the second position, and
wherein upon rotation of the at least one rotatable cam fastener from the second position to the first position, a contact force between the radial cam surface and the cam follower moves the panel relative to the frame in a first direction perpendicularly toward the axis of rotation, and a contact force between the helical cam surface and the receiver surface moves the panel relative to the frame in a second direction along the axis of rotation toward the ledge surface.

13. The fenestration assembly of claim 12, wherein the second direction is substantially orthogonal to the first direction.

14. The fenestration assembly of claim 12, wherein the first direction is substantially parallel to the panel and the second direction is substantially perpendicular to the panel.

15. The fenestration assembly of claim 12, further comprising a seal member, the seal member being compressible between the panel and the frame as the at least one rotatable fastener moves from the second position to the first position.

16. The fenestration assembly of claim 12, wherein:
movement of the panel in the second direction compresses a seal disposed between the front side of the panel or the rear side of the panel and the ledge surface.

17. The fenestration assembly of claim 12, wherein the at least one rotatable cam fastener includes a first rotatable cam fastener and a second rotatable cam fastener;
wherein the at least one receiver includes a first receiver;
the fenestration assembly further comprising a second receiver disposed along the inner perimeter of the frame, such that the second receiver is positioned to be in alignment with the second rotatable cam fastener, and
the first receiver including the cam follower and the second receiver being absent the cam follower such that upon rotation of the second rotatable cam fastener, the panel moves in the second direction.

18. A method of installing a fenestration panel to a frame comprising:
providing the fenestration panel comprising:
a front side, a rear side opposite the front side, and a thickness between the front side and the rear side, at least one rotatable cam fastener moveably supported by the panel and disposed along an outer perimeter of the panel between the front and rear sides and supported for movement between a first position and a second position relative to the panel, the at least one fastener comprising:
a first side and a second side, an axis of rotation of the rotatable cam fastener intersecting the first side and the second side, the first side including an axially facing surface that is flat and perpendicular to the axis of rotation, a thickness direction of the rotatable cam fastener defined between the first side and the second side, the axis of rotation disposed perpendicular to front and rear sides of the panel,
a slot that is open at the first side and the second side to define a hook, the slot including a first radial cam surface that is radially disposed at least partially about the axis of rotation, and the hook including a second helical cam surface that is ramped in the thickness direction and that is helical with respect to the axis of rotation, the second helical cam surface intersecting and blending into the axially facing surface of the first side, wherein the second helical cam surface is substantially orthogonal to the first radial cam surface;

providing a fenestration frame configured to receive the panel, the frame comprising:

an opening having an inner perimeter surface sized to receive the panel, a ledge with a ledge surface disposed along at least a portion of the inner perimeter surface and extending inwardly from the inner perimeter surface of the opening, at least one complementary receiver disposed along the inner perimeter surface such that the at least one receiver is positioned to be in alignment with a respective one of the at least one fastener, the at least one receiver comprising:

a cavity comprising a receiver surface proximate to the ledge surface, the hook received in the cavity when in the first position, the hook disposed outside the cavity when in the second position, the receiver surface positioned to contact and follow the second helical cam surface as the fastener moves between the first position and the second position, and a cross member extending across the cavity from the receiver surface and defining a cam follower;

placing the panel within the frame to position the at least one receiver relative to the at least one fastener such that:

the cam follower is positioned to contact and follow the first radial cam surface as the at least one fastener moves between the first position and the second position, and upon rotation of the at least one fastener from the second position to the first position, a contact force between the first radial cam surface and the cam follower moves the panel relative to the frame in a radial first direction perpendicularly toward the axis of rotation, and a contact force between the second helical cam surface and the receiver surface moves the panel relative to the frame in an axial second direction parallel to the axis of rotation toward the ledge surface.

19. The method of claim 18, wherein rotating the at least one fastener comprises inserting a tool through an orifice in the front side or the rear side of the panel and establishing a torque interface between the tool and the rotatable cam fastener.

20. The method of claim 18, wherein the at least one fastener is rotated between 80 and 190 degrees.

* * * * *